Dec. 15, 1964 H. A. MACKIE 3,161,247
AIR CUSHION LOAD SUPPORTING DEVICE
Filed May 19, 1961
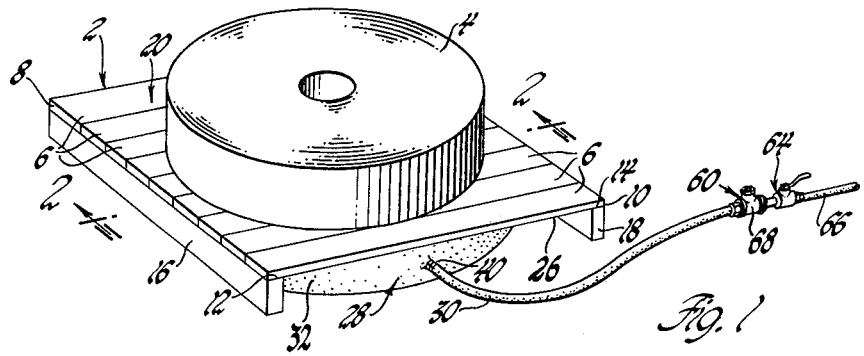
INVENTOR.
Harry A. Mackie
BY
W. F. Wagner
ATTORNEY

United States Patent Office 3,161,247
Patented Dec. 15, 1964

3,161,247
AIR CUSHION LOAD SUPPORTING DEVICE
Harry A. Mackie, Birmingham, Mich., assignor to General Motors Corporation, Detroit, Mich., a corporation of Delaware
Filed May 19, 1961, Ser. No. 111,290
12 Claims. (Cl. 180—7)

This invention relates to air cushion load supporting devices and more particularly to air cushion devices adapted especially, although not exclusively, for use in conjunction with industrial pallets.

For many years, one of the more common methods for transporting materials within industrial facilities has been to load such materials on platforms, the surface of which is displaced a short distance from the ground by means of a pair of parallel runners. Commonly, such pallets are formed of a plurality of boards or planks arranged in side by side relation with the ends thereof secured to laterally spaced parallel two-by-fours. The two-by-fours not only serve as a convenient method of fastening the planks into a permanent platform, but also raise the level of the platform sufficiently above the ground to enable insertion of the forks of a standard fork-lift truck so that both the pallet and the load supported thereon may be quickly transported from one spot to another. The present invention is primarily, although not exclusively, concerned with the provision of a highly portable air cushion supporting device for use with such standard pallets without any modification of the latter.

An object of the invention is to provide an improved materials handling device.

Another object is to provide an air cushion load supporting device for use in conjunction with standard raised platform pallets.

A further object is to provide a device of the stated character which is collapsible when not in use.

Yet a further object is to provide a one-piece industrial pallet air cushion supporting device which is entirely self-contained and requires no adjustment relative to or positive connection with the pallet when utilized in conjunction therewith.

Still a further object is to provide a device of the stated character including means for supplying a high volume of low pressure air thereto.

A still further object is to provide a device of the type described incorporating means for deriving such low pressure air from a high pressure air source such as is commonly present in industrial facilities.

Yet another object is to provide a device of the stated character which is simple, efficient, highly portable, entirely free of moving parts, and susceptible to manufacture from inexpensive materials by well known low cost techniques.

These and other objects, advantages, and features of the invention will become more fully apparent as reference is had to the accompanying specification and drawing wherein:

FIG. 1 is a perspective view of a loaded conventional wooden industrial pallet in operating association with an air cushion load supporting device according to the invention;

FIG. 2 is a sectional elevational view looking in the direction of arrows 2—2 of FIG. 1;

FIG. 3 is a bottom plan view of the structure shown in FIG. 1, portions thereof being broken away and partly in section; and FIG. 4 is an enlarged view partly in section illustrating the details of construction of the device utilized to convert high air line pressure to low pressure high volume suitable for operation of the supporting device.

Referring now to the drawings and particularly FIG. 1, there is shown a wooden pallet assembly 2 upon which is supported a typical load in the form of a coiled metal strip 4. Pallet 2, in accordance with conventional practice, is formed of a plurality of boards 6 which are laid side by side and have their opposite flush ends 8 and 10 secured by any suitable means to the top edges 12 and 14 of generally parallel laterally spaced apart runners 16 and 18. Runners 16 and 18 are conveniently formed of two-by-fours, two-by-sixes, or other standard size lumber, which in each case serves to maintain the horizontal platform portion 20 of pallet 2 some distance above the floor or ground level 22.

In accordance with the persent invention, the space 24 existing between the lower surface 26 of platform 20 and the ground or floor 22 has disposed therein an air cushion load supporting device 28 which functions in a manner similar to the device disclosed in copending application Serial No. 4,465, Mackie et al., entitled "Air Cushion Vehicle." Thus, upon introduction of the continuous high volume flow of low pressure air through a connecting air line 30, a "pad" or "cushion" of air is created beneath the circular plan form area of the cushion which maintains device 28, pallet 2 and load 4 in frictionless spaced relation above the floor or ground level 22. Naturally, as soon as levitation or frictionless spaced relation is established, the pallet and load are readily displaced horizontally due to the absence of friction. Furthermore, not only is the pallet and load easily moved under such conditions, but in addition the total levitation of the pallet and load permits full omni-directional control which cannot be attained when fork-lift trucks or other wheeled transporting mechanisms are employed.

As stated previously, the functional characteristics of the present invention are generally similar to the device shown in copending application Serial No. 4,465, Mackie et al. However, in accordance with the general features of the invention, the load supporting device 28 per se is formed and fabricated so as to be readily coupled and decoupled with any standard dimension pallet. In addition, the entire structure which forms the actual load supporting device is a one-piece flexible structure which when inoperative may be totally collapsed for storage or transportation.

According to one feature of the invention, load supporting device 28 includes a torus portion 32 in the form of a circular tube of generally elliptical cross section. An imperforate circular web portion 34 is attached to torus 32 and extends across the space defined by the inner diameter of the latter. In the embodiment shown, web portion 34 is attached to torus 32 vertically intermediately thereof and is therefore slightly greater in diameter than the inside diameter defined by the torus 32 so that upon operation of the device, the central portion of web 34 is caused to assume abutting contact with the lower surface 26 of platform 2. It will be understood however that the indicated level of attachment is for purposes of illustration only, it being understood that web 34 may extend completely horizontally and be attached to torus 32 at the upper level of curvature of the torus.

From the construction described, it will be seen that web 34 and the inner wall portion of torus 32 form a plenum cavity 36, the area of which is bounded by the lowermost extremity of curvature 38. Consequently, by connecting conduit 30 to quick disconnect coupling 40 molded on torus 32, low pressure air is introduced into the annular cavity 42 defined by torus 32 and the cavity air pressure is raised to slightly above atmospheric pressure causing the torus to inflate to the cross-sectional shape shown in FIG. 2. This shape is determined in part by the vertical dimension of the runners 16 and 18. That is, the minor diametric dimension of torus 32 must be sufficient when inflated to elevate the lower surfaces 44 and 46 of the runners a suitable distance above the surface 22. While the amount of elevation is not critical other than being sufficient to clear normal surface irregularities, in the preferred embodiment the degree of elevation is limited by vertically extending cords or strips 48, the opposite ends of which are embedded in the wall of torus 32 to restrain the latter in a generally elliptical cross-sectional configuration. After air introduced through line 30 accomplishes the described inflation of torus 32, continuing flow of air is emitted through a plurality of circumferentially spaced apertures 50, 52, 54, and 56 formed in the inwardly facing portion of torus 32. Hence, the plenum cavity 36, previously referred to, is also subjected to superatmospheric pressure corresponding to the pressure within torus cavity 42. Thereafter, in accordance with the known operating characteristics of the device, the superatmospheric air pressure within plenum cavity 36 exerts sufficient lifting force to elevate the device, the pallet and load until a circular perimetrical gap 58 has been established between the lowermost extremity of curvature 38 of torus 32 and the surface 22. This gap (greatly exaggerated for purposes of clarity) operates as a valve which limits or restricts radial discharge or leakage of air from plenum cavity 36 to atmosphere. Although the gap 58 is on the order of a few thousandths of an inch, there is nevertheless established a total frictionless relation between all portions of the supporting device, pallet and load relative to the ground which permits the free movement of the load in any direction.

In accordance with another feature of the invention, means are provided for supplying the device 28 with a high volume of low pressure air from any convenient external source of high pressure air. In the embodiment shown, this is accomplished by an aspirator 60 which preferably forms a permanent part of line 30. By the utilization of aspirator 60, support 28 may be energized from a high pressure air supply source such as an engine driven compressor, not shown, commonly present in industrial establishments. In consequence, the device does not require either a separate source of air pressure or an attached air pressure generating mechanism. As seen best in FIG. 4, aspirator 60 includes a high pressure nozzle 62 attached to the output end of a cock valve 64 which in turn is connected to high pressure line 66. Nozzle 62 extends into one end 67 of a T 68 with the extremity thereof extending slightly beyond an atmosphere communicating opening 70 in T 68 in the direction of the opposite end 72 of T 68. The opposite end 72 in turn connects to low pressure line 30. Upon opening of high pressure line cock valve 64, high pressure air is emitted through nozzle 62 and is aspirated or mixed with atmospheric air drawn in through opening 70 with the result that a high volume of low pressure air is transmitted through line 30 into supporting device 28.

From the foregoing it will be seen that an extremely simple, economical and versatile load supporting device has been provided. The invention is not only useful for varied applications, but has additional advantages such as minimum storage space requirements and complete absence of moving parts. It is also to be noted that the device is readily susceptible to a variety of standard fabrication techniques such as employed, for example, in the manufacture of inner tubes and particularly the more recent dielectric bonding and embossment technique utilized in fabricating vinyl and other plastic materials. Furthermore, especially when employing the latter technique, any desired plan form configuration may be readily achieved. In addition, because of the extremely low pressures involved, very thin flexible material may be employed so that both the material cost and fabricating cost are extremely low. Hence, large numbers and varieties of shapes and sizes of the device may be stocked at a cost representing only a small fraction of the cost of one mechanical materials handling device. In addition, because of the unitary and totally flexible character of the device, large numbers may be stored in an extremely small space. Similarly, the inherently small space required by the device when not in use enhances the element of portability.

While but one embodiment of the invention has been shown and described, it will be apparent that other changes and modifications may be made therein. It is, therefore, to be understood that it is not intended to limit the invention to the embodiment shown, but only by the scope of the claims which follow.

I claim:

1. In combination with a platform pallet having depending runners normally engaging a supporting surface, a flexible toroidal body disposed between said runners, an imperforate surface enclosing the opening defined by the inner periphery of said toroidal body, means for introducing superatmospheric air into said toroidal body, and means for venting said toroidal body into the space bounded thereby and beneath said imperforate surface.

2. In combination with a platform pallet having depending runners normally engaging a supporting surface, a flexible toroidal body disposed between said runners, means for introducing superatmospheric air into said toroidal body, means for venting said toroidal body into the space bounded thereby, and impervious means spaced above said venting means extending across and closing the space at one side thereof.

3. In combination with a platform pallet having depending runners normally engaging a supporting surface, a flexible walled toroidal body disposed horizontally between said runners and beneath said surface, means on said toroidal body for introducing superatmospheric air therein, means in said toroidal body for venting the interior of said body into the space bounded thereby, a generally horizontally extending imperforate flexible wall connected to said toroidal body extending across and completely enclosing the last mentioned space at a vertical level above said venting means.

4. The structure set forth in claim 3 wherein said imperforate wall is integral with said toroidal body.

5. The structure set forth in claim 4 wherein said imperforate wall is connected to said toroidal body at a vertical level midway between the upper and lower extremities of said toroidal body.

6. The structure set forth in claim 5 wherein the area of said imperforate wall is greater than the area defined by the inner periphery of said toroidal body.

7. An air cushion load supporting device comprising, a flexible wall toroidal body having an impervious web connected to the inner periphery thereof, means for coupling the interior of said toroidal body with a source of superatmospheric air, and means forming a plurality of apertures in the wall of said toroidal body adjacent the inner periphery thereof and below said web.

8. The structure set forth in claim 7 wherein said toroidal body is circular in plan form.

9. An air cushion load supporting device comprising, a flexible wall toroidal body of elliptical cross section having an integral imperforate web connected to the inner periphery thereof, means for coupling the interior of said toroidal body with a source of superatmospheric air, and means forming a plurality of apertures in the wall of said toroidal body adjacent the inner periphery thereof, all of said apertures being located at one side of said imperforate wall.

10. An air cushion load supporting device comprising, a normally horizontally disposed thin walled flexible toroidal body of generally elliptical cross section, an imperforate web secured to said body closing the opening defined by the inner periphery of said body, a plurality of apertures formed in the wall of said toroidal body inboard of the centerline of said toroidal body elliptical cross section, a coupling device outboard of said centerline, and an air conduit connected to said coupling device for supplying a continuous flow of low pressure air to said device.

11. In combination with a source of high pressure air, an air cushion load supporting device comprising, a normally horizontally disposed flexible wall toroidal body of generally elliptical cross section, an imperforate web secured to said body and closing the opening defined by the inner periphery of said body, a plurality of apertures formed in the wall of said toroidal body inboard of the centerline of said elliptical cross section, a coupling device on the outer wall of said body, a low pressure air conduit connected to said coupling device, a high pressure air conduit connected to said source, and an aspirator interconnecting said high and low pressure conduits.

12. The structure set forth in claim 9 wherein said toroidal body is provided with a plurality of integral tension cords which restrain said body in said elliptical shape during operation of said device.

References Cited in the file of this patent

UNITED STATES PATENTS

| 809,048 | Furchtbar | Jan. 2, 1906 |
| 2,918,183 | Petersen et al. | Dec. 22, 1959 |